(12) United States Patent
Coffey

(10) Patent No.: US 7,239,888 B2
(45) Date of Patent: Jul. 3, 2007

(54) WIRELESS NETWORK WITH MULTI-DEVICE CLASS COMMUNICATION CAPABILITY

(75) Inventor: John T. Coffey, San Francisco, CA (US)

(73) Assignee: Texas Instruments Incorporated, Dallas, TX (US)

( * ) Notice: Subject to any disclaimer, the term of this patent is extended or adjusted under 35 U.S.C. 154(b) by 368 days.

(21) Appl. No.: 10/718,954

(22) Filed: Nov. 21, 2003

(65) Prior Publication Data

US 2004/0185898 A1  Sep. 23, 2004

Related U.S. Application Data

(60) Provisional application No. 60/456,298, filed on Mar. 20, 2003.

(51) Int. Cl.
H04M 1/00 (2006.01)

(52) U.S. Cl. .................. 455/550.1; 370/346; 370/449; 455/418; 455/420; 709/207

(58) Field of Classification Search ................ 455/561, 455/418, 420, 500, 550.1; 370/468, 444, 370/336, 346, 449; 709/226, 207
See application file for complete search history.

(56) References Cited

U.S. PATENT DOCUMENTS

| | | | |
|---|---|---|---|
| 5,659,787 A * | 8/1997 | Schieltz .................... 709/226 |
| 6,778,557 B1 * | 8/2004 | Yuki et al. .................. 370/468 |
| 6,865,580 B1 * | 3/2005 | Bush ...................... 707/103 Y |
| 6,876,850 B2 * | 4/2005 | Maeshima et al. ........ 455/422.1 |
| 2002/0054578 A1 * | 5/2002 | Zhang et al. ............... 370/328 |
| 2002/0075839 A1 * | 6/2002 | Dick et al. .................. 370/342 |
| 2002/0093929 A1 * | 7/2002 | Mangold et al. ............ 370/336 |
| 2002/0163928 A1 * | 11/2002 | Rudnick et al. ............ 370/444 |
| 2002/0167961 A1 * | 11/2002 | Haartsen ..................... 370/444 |

* cited by examiner

Primary Examiner—Danh Le
(74) Attorney, Agent, or Firm—Steven A. Shaw; W. James Brady; Frederick J. Telecky, Jr.

(57) ABSTRACT

A wireless device (e.g. an access point) is adapted to communicate wirelessly with a class 1 device and a class 2 device, wherein the class 2 device is capable of communicating in a manner that is not compatible with the class 1 device. The wireless device may comprise host logic, an antenna, and a MAC coupled the host logic and the antenna. The MAC may cause the wireless device to emit a poll that is recognized differently by the class 1 device as compared to the class 2 device and that causes the wireless device to operate for a reserved period of time in which the class 2 device can communicate in a manner that is not compatible with the class 1 device.

16 Claims, 1 Drawing Sheet

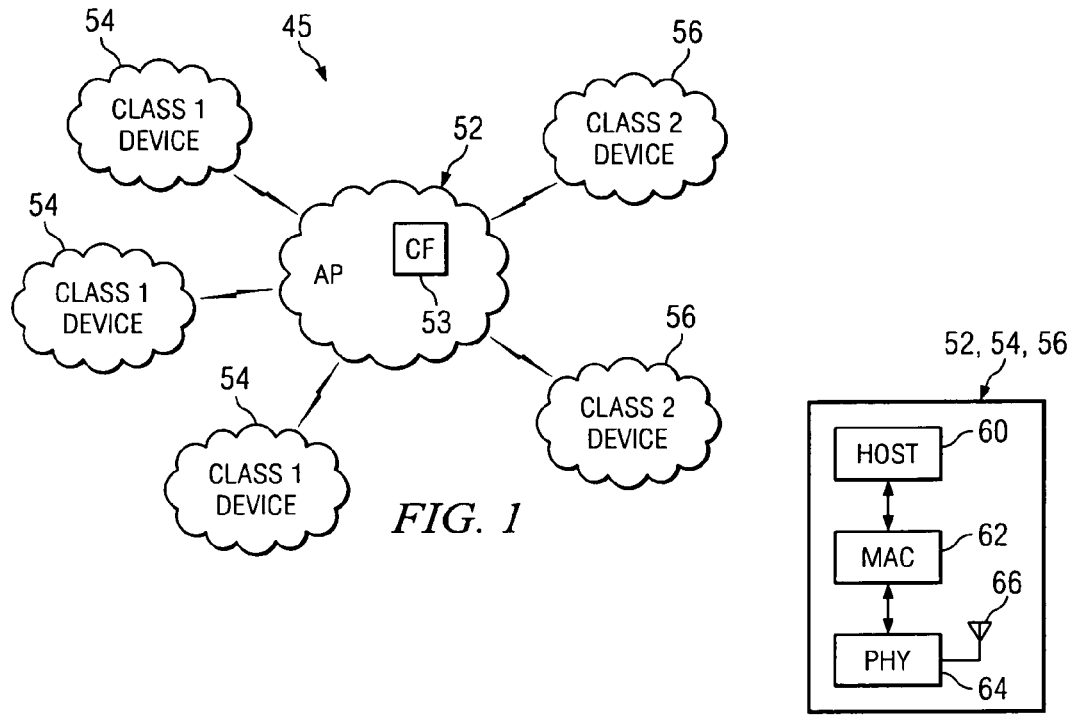
FIG. 1
FIG. 2
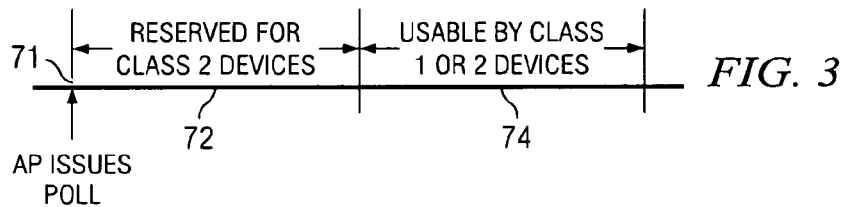
FIG. 3
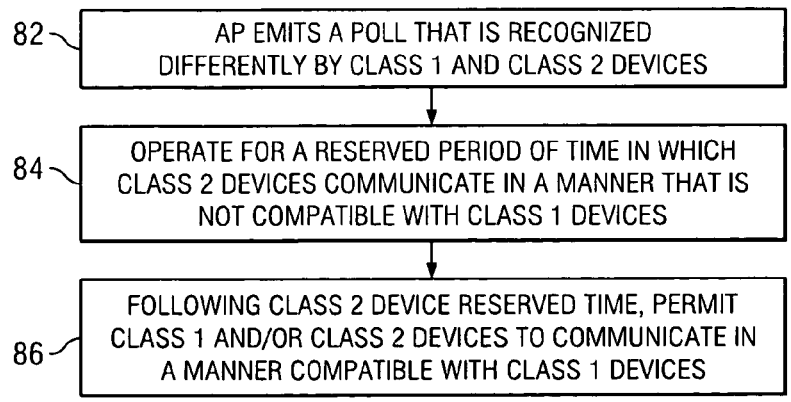
FIG. 4

WIRELESS NETWORK WITH MULTI-DEVICE CLASS COMMUNICATION CAPABILITY

CROSS-REFERENCE TO RELATED APPLICATIONS

This application claims priority to U.S. Provisional Application No. 60/456,298 filed Mar. 20, 2003 and entitled "Method to Regulate Channel Access Between Enhanced and Legacy Devices in Wireless Networks, Particularly IEEE 802.11 Networks," incorporated herein by reference.

BACKGROUND OF THE INVENTION

1. Technical Field

The present subject matter relates to communication networks and particularly to networks that can accommodate multiple classes of devices.

2. Background Information

Various industry communication standards have been promulgated to which devices that couple to a network adhere to ensure that disparate devices and devices from different manufacturers can effectively communicate with each other. One exemplary family of standards related to wireless local area networks ("WLANs") is the IEEE 802.11 family of standards.

As technology progresses, the performance of electronic devices generally increases as is desirable. For example, the maximum achievable data transfer rate between devices on a network may increase. It may be desirable for purposes of achieving higher performance, in fact, to permit newer devices to deviate from an older standard. Being free of the confines of an older standard may permit the new devices to achieve higher levels of performance that would otherwise be impractical or impossible given the older standard.

Although deviation from an older standard to develop newer devices may be desirable for performance reasons, doing so is not always practical because the devices already in use that comply with the older standard may not be compatible with the newer devices, thereby effectively making the older devices obsolete. This problem is particularly acute in wireless LANs that operate in unlicensed spectrum, where the spectrum is a shared resource. In such cases the devices compatible with the older standard ("legacy devices") may have already been deployed in large numbers and be operational in the frequency band of interest. Thus, a tension exists between development of newer devices that achieve higher levels of performance and retaining use of older devices.

BRIEF SUMMARY

In at least some embodiments, a wireless device (e.g. an access point) is adapted to communicate wirelessly with a class 1 device and a class 2 device, wherein the class 2 device is capable of communicating in a manner that is not compatible with the class 1 device. In this embodiment, the wireless device may comprise host logic, an antenna, and a medium access control (MAC) coupled the host logic and the antenna. The MAC may cause the wireless device to emit a message that is recognized differently by the class 1 device as compared to the class 2 device and that causes the wireless device to operate for a reserved period of time in which the class 2 device can communicate in a manner that is not compatible with the class 1 device. The message preferably is interpreted by the class 2 device as being an invitation for any class 2 device to use the wireless medium in a class 2 specific manner to initiate communications to the extent any class 2 device has a need for such communications.

In other embodiments, a wireless network may comprise an access point, a plurality of class 1 devices, and a plurality of class 2 devices, wherein the class 2 devices are adapted to communicate in a manner that is compatible with the class 1 devices and also in a manner that is not compatible with the class 1 devices. The access point emits a multi-device class mesage that causes the class 1 devices to remain off the network and permits any class 2 devices to communicate for a period of time in a manner that is not compatible with the class 1 devices.

In yet another embodiment, a method comprises, during a specified time period, precluding a first plurality of devices from communicating on a wireless network and permitting a second plurality of devices to communicate on the wireless network while the first plurality of devices is precluded from communicating on the wireless network. Further, during the specified time period, the second plurality of devices is permitted to communicate in a manner that is incompatible with the first plurality of devices.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 1 shows a wireless communication network in which two classes of devices communicate with a common access point;

FIG. 2 shows block diagram of the devices and access point of FIG. 1;

FIG. 3 illustrates a preferred embodiment of the invention for reserving a period for one class of devices to communicate in a manner not compatible with other classes of devices; and FIG. 4 provides an exemplary method of implementing the technique depicted in FIG. 3.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 illustrates a communication network 45 implemented in accordance with a preferred embodiment of the invention. As shown, the network 50 comprises a wireless network in which one or more devices 54, 56 wirelessly communicate with an access point ("AP) 52. Devices 54 and 56 also may communicate with each other. The devices 54, 56 may comprise desktop computers, notebook computers, computer-related equipment in general, or any type of device that is desired to be used in a communication network. Further, more than one AP 52 can be provided as desired. Preferably, each such AP 52, device 54 and device 56 is assigned a unique address that facilitates communication between devices.

As shown in FIG. 1, the devices 54 and 56 are of at least two different classes—class 1 and class 2. The term "class" signifies that the devices 56 are capable of communicating over the wireless medium in a manner that is not compatible with how devices 54 communicate. Further, in some embodiments, the class 2 devices 56 are capable of selectively communicating in a manner that is compatible with class 1 devices 54 or in a manner that is not compatible with class 1 devices. When communicating in a manner that is not compatible with class 1 devices, class 2 devices can communicate in an enhanced (relative to the class 1 devices), more efficient manner.

By way of example, class 1 devices may communicate using a point coordination function ("PCF") technique. In the PCF technique, an access point may issue a poll message that other devices in a wireless network use to determine when such devices are permitted to access the wireless medium. The poll may contain an address of a device that is permitted to respond to the poll. All other devices (not matching the address in the poll) preferably refrain from initiating communications on the network during the polled period. The poll indicates to the device with the polled address that the device is permitted to access the wireless medium in a manner consistent with the poll and the applicable wireless protocol. The poll may indicate, for instance, the length of a time window during which all devices are permitted to attempt to access the wireless medium to send and retrieve data or other suitable activities. A class 2 device may be capable of communicating using the PCF technique or a distributed coordination function ("DCF) technique. In a DCF technique, each device takes a random interval (hopefully unique to each device) in which the device plans to transmit. Each such device includes a counter that typically counts down toward zero in various time intervals in which the wireless medium is not being used by other devices. If another device is using the medium, the counters of other devices are frozen. Upon completion of the transmission, the counters are permitted to continue counting down. If, however, two or more devices coincidentally choose the same initial random interval to initialize their counters, such devices will "collide" when their counters reach the terminal value concurrently. In such a case, the colliding devices may be permitted to choose a new random interval to begin anew the count down process. In fact, the spectrum of values over which such a new random interval is chosen can be expanded (e.g., doubled) to help minimize the risk of another collision.

In accordance with current standards, one may use PCF or DCF or variants. If the network is using PCF or a variant, the distinguishing feature is that devices are individually polled, and thus there is no contention, and no possibility of a collision with another device in that network. On the other hand, if the network is using DCF or a variant, each device chooses a random time to transmit next, and can transmit if its counter reaches 0. The device continues to monitor the wireless medium while counting down, and if the device detects a transmission it recognizes while counting down, the device determines that another device in the network is transmitting and freezes its counter until the other device has stopped transmitting. The PCF-type method is advantageous in that collisions are minimized or eliminated; however it has the drawback that the access point must engage in a great deal of bookkeeping to determine which device should transmit next. This method becomes increasingly more unwieldy as the number of devices on the network expands. The DCF methods have the advantage that a central coordination function is not required as determining which device should transmit next is distributed among all the devices. However, the DCF methods have a disadvantage even in regular use in that collisions may still occur.

In the context of class 1/class 2 devices, the DCF methods have a disadvantage in that the DCF devices must monitor the medium while the DCF devices count down, and only freeze the counter upon detection of a recognized packet. DCF devices stay off the air for the amount of time that the other device is on the air, an amount of time determined by decoding the header and examining the length field. As a result, in DCF-type methods new efficient preambles and headers cannot be used, because legacy devices will not necessarily recognize such preambles and headers and thus will not necessarily freeze their counters and stay off the air. Thus, a legacy (class 1) device may talk "over" new (class 2) devices. Therefore, the present disclosure introduces a blend of PCF and DCF. The PCF function is used to keep legacy devices off the air. A legacy formatted poll is issued for a fictitious device indicating that the fictitious device will be on the air for some (relatively long) period of time. The class 2 devices determine that the class 2 devices are being permitted to transmit. However, in this time the new class 2 devices transmit using DCF-type rules. When compared to DCF-only, the PCF part of the disclosed technique means that legacy devices are held off the air, so that during the long reserved period, the class 2 devices can communicate in more efficient ways. On the other hand, when compared with PCF-type methods, the disclosed technique does not require centralized control in regulating channel access among the new devices: class 2 devices can operate in distributed fashion among themselves. Thus, a multi-device poll is provide that reserves time for a multiplicity of devices. As this method is not allowed in legacy standards, the method of sending a legacy poll for a fictitious device is adopted. This poll is interpreted by legacy (class 1) devices as a valid poll for a device; and by class 2 devices as a multi-device poll.

Referring still to FIG. 1, to coordinate the various class 1 and class 2 wireless devices, the access point 52 preferably implements "coordination function" logic 53. The coordination function logic 53 enables the AP 52 to coordinate the use of the wireless medium for the various devices 54 to communicate with each other and with the AP. The coordination function logic 53 is thus capable of implementing a PCF or a DCF as may be the case for the various devices 54, 56.

FIG. 2 shows a block diagram that is representative of the AP 52 and of the class 1 and class 2 devices. As shown, each such device comprises host logic 60 that is specific to the functionality of the device 52, 54, 56. The host logic 60 couples to a medium access control ("MAC") 62 which, in turn, couples to a physical layer ("PHY"). The MAC 62 generally implements one or more communication protocols to permit the device 52-56 to communicate with other wireless devices in the network 45. In some embodiments, the MAC 62 may comport with one or more of the IEEE 802.11 protocols. In accordance with the preferred embodiment of the invention, the MAC 62 also implements the coordination function 53 described above and further detailed below. The PHY 64 couples to one or more antennas 66 and preferably comprises transmit and receive circuitry.

The AP 52, via its coordination function logic 53, is capable of issuing one of a variety of poll messages, as explained above, that other devices in the network 45 can use to determine when such devices are permitted to access the wireless medium. Such polls preferably contain a range of address of devices to which the poll is targeted. As explained, the poll indicates to such corresponding devices that the devices are permitted to access the wireless medium in a manner consistent with the poll and the applicable wireless protocol. The poll may indicate the length of a time window during which all devices corresponding to the address are permitted to attempt to access the wireless medium to send and retrieve data or other suitable activities. In accordance with the preferred embodiment of the invention, the AP 52 emits a "multi-device class" poll that is recognized differently by a class 1 device as compared to a class 2 device. That is, the multi-device class poll signifies something different to a class 1 device as to a class 2 device. This difference is explained below. The format of such a multi-device class poll preferably is compatible with the class 1 devices, as well as the class 2 devices, and may contain a predetermined address that does not correspond to any of the class 1 or class 2 devices. To a class 1 device, the predetermined address signifies that the poll is directed to another device and thus, per the coordination function implemented in the class 1 devices (e.g., PCF), each class 1 device remains off the wireless network during the polling period specified by the multi-device class poll. To a class 2 device, the particular predetermined address in the poll signifies that the AP is permitting the class 2 devices an opportunity to communicate on the wireless network in a manner that may not be compatible with class 1 devices, that is, in a class 2 device-specific manner. Moreover, via the multi-device class poll, the AP 52 is able to reserve a time period specific to class 2 devices (i.e., not class 1 devices) and the class 2 devices may contend for the medium under DCF-type rules.

Referring now to FIGS. 3 and 4, the coordination function 53 will be explained in greater detail. FIG. 3 illustrates the relative timing of the multi-device class poll and the actions that follow. FIG. 4 provides a series of actions that may be implemented in the coordination function 53 of the AP 52.

In FIG. 3, at 71 the AP issues the multi-device class poll. In FIG. 4, this event is described in block 82 in which the AP emits a poll that is recognized differently by class 1 and class 2 devices. The predetermined address mentioned above that is contained in the poll and that does not correspond to a class 1 device causes all class 1 devices to refrain from attempting to access the wireless network. That is, the class 1 devices determine that, via the poll, the AP 52 is targeting other devices (including class 1 devices) that the AP 52 wishes to permit access to the wireless network 45. The class 2 devices preferably are configured to recognize the poll's predetermined address as signifying the invocation of a reserved period of time (e.g., a window) during which class 2 devices are permitted to communicate in a manner that may not be compatible with class 1 devices and presumably, but not necessarily, in a manner that is faster and/or more efficient than the manner in which class 1 devices ordinarily communicate. At 84 in FIG. 4, the AP 52 thus causes the wireless network to operate for a reserved period of time (denoted at 72 in FIG. 3) in which class 2 devices are permitted to communicate in a manner that may not be compatible with class 1 devices. At 86 in FIG. 4 and 74 in FIG. 3, following the class 2 device reserved time window, the AP 52 preferably permits any of the network's devices to initiate data transmissions. In some embodiments, both class 1 and class 2 devices are permitted to communicate during this period of time 74 in a manner that is compatible with class 1 devices. In other embodiments, only class 1 devices are permitted to communicate during time period 74.

The coordination function 53 described above permits an access point to be used in conjunction with multiple classes of devices, some of which may be capable of communicating in a way that is not commensurate with other devices. As such, newer, enhanced devices (e.g., class 2 devices) can be introduced into an existing network 45 so as to permit the newer, enhanced devices to take advantage of whatever enhancements such devices may have without forcing the older devices (e.g., class 1 devices) into obsolescence. Further, the length of the reserved window 72 is dictated by or determinable from a value in the multi-class device poll. Thus, the AP 52 can vary the length of the class 2 device reserved time window 72 via the poll. As such, the AP 52 can customize or optimize the size of the reserved window 72 according to the number of class 2 devices present in the network 45 or according to the number of class 2 devices relative to the number of class 1 devices. Over time, if one or more class 1 devices are removed from the network, the AP 52 thus can lengthen the size of the class 2 device window 72 relative to class 1,2 device window 74.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For instance, more than two classes of device can be accommodated. Accordingly, the scope of protection is not limited by the description set out above. Each and every claim is incorporated into the specification as an embodiment of the present invention.

What is claimed is:

1. A wireless device that is adapted to communicate wirelessly with a class 1 device and a class 2 device, wherein the class 2 device is capable of communicating in a manner that is not compatible with the class 1 device, the wireless device comprising:

host logic;

an antenna; and a medium access control (MAC) coupled the host logic and the antenna;

wherein the MAC causes the wireless device to emit a poll and wherein the class 1 device and the class 2 device each includes a unique address, and the poll includes a predetermined address that does not correspond to either of the addresses of the class 1 and class 2 devices and is interpreted by the class 1 device for the class 1 device to avoid initiating communications during a reserved period of time and is interpreted by the class 2 device as identifying the reserved period of time.

2. The wireless device of claim 1 wherein the poll is recognized by the class 1 device as a single-device poll and by the class 2 device as a multi-device poll, and wherein the poll causes the wireless device to operate for the reserved period of time in which the class 2 device can communicate in a manner that is not compatible with the class 1 device.

3. The wireless device of claim 2 wherein, following the reserved period of time, the MAC of the wireless device permits the class 1 and class 2 devices to communicate in a manner that is compatible with the class 1 devices.

4. The wireless device of claim 1 wherein, during the reserved period of time, the class 2 device uses a preamble that does not comport with preambles associated with the class 1 device.

5. The wireless device of claim 1 wherein, following the reserved period of time, the MAC of the wireless device permits the class 1 device to communicate.

6. The wireless device of claim 1 wherein the wireless device comprises an access point.

7. A wireless network, comprising:
an access point;
a plurality of class 1 devices each includes a unique address; and
a plurality of class 2 devices each includes a unique address, wherein the class 2 devices are adapted to communicate in a manner that is compatible with the class 1 devices and also in a manner that is not compatible with the class 1 devices;
wherein the access point emits a multi-device class poll that includes a predetermined address that does not correspond to either of the addresses of the class 1 and class 2 devices and that causes the class 1 devices to remain off the network for a reserved period of time and permits the class 2 devices to communicate for the reserved period of time in a manner that is not compatible with the class 1 devices.

8. The wireless network of claim 7 wherein the reserved period of time is determined from the multi-device class poll.

9. The wireless network of claim 7 wherein, following the reserved period of time, the access point permits the class 1 devices to communicate on the network.

10. The wireless network of claim 7 wherein, following the reserved period of time, the access point permits both class 1 and class 2 devices to communicate on the network.

11. The wireless network of claim 10 wherein, during the reserved period of time, the class 2 devices communicate on the network using preambles that cannot be interpreted correctly by the class 1 devices, and wherein, following the reserved period of time, the access point permits both class 1 and class 2 devices to communicate on the network using preambles that the class 1 devices can interpret.

12. The wireless network of claim 11 wherein the predetermined address is interpreted by each class 2 device as signifying a beginning of the reserved period of time.

13. The wireless network of claim 7 wherein, during the reserved period of time, the class 2 devices use a preamble that does not comport with preambles associated with the class 1 devices.

14. A method of comprising
emitting a poll that contains an address that does not correspond to any of a first plurality of devices and a second plurality of devices
precluding the first plurality of devices from communicating on a wireless network during a specified time period;
permitting a second plurality of devices to communicate on the wireless network via contention-based access while the first plurality of devices is precluded from communicating on the wireless network during the specified time period wherein the second plurality of devices communicate in a manner that is incompatible with the first plurality of devices during the specified time period.

15. The method of claim 14 further comprising, following the specified time period, permitting the first plurality of devices to communicate on the wireless network.

16. The method of claim 14 further comprising, following the specified time period, permitting the first plurality and second plurality of devices to communicate on the wireless network in a manner that is compatible with the first plurality of devices.

* * * * *